July 8, 1941.  W. H. FISCHER  2,248,666
THERMOSTATIC SWITCH
Filed Nov. 25, 1938
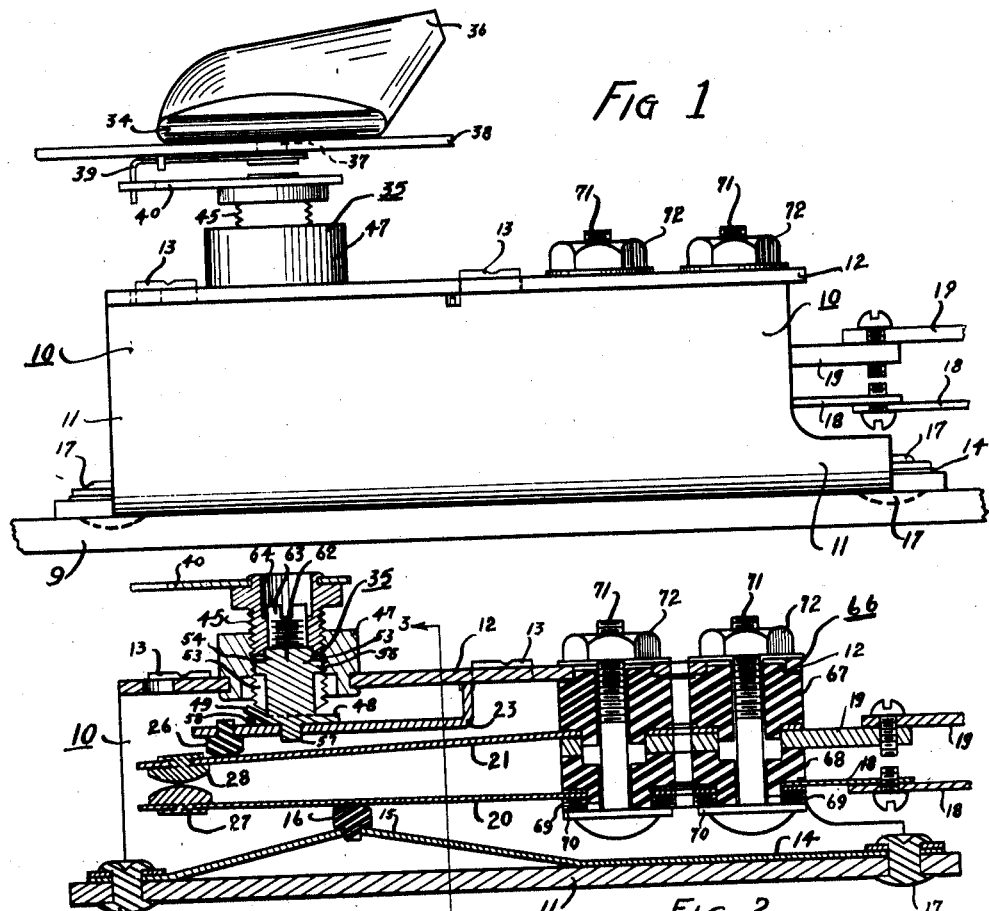
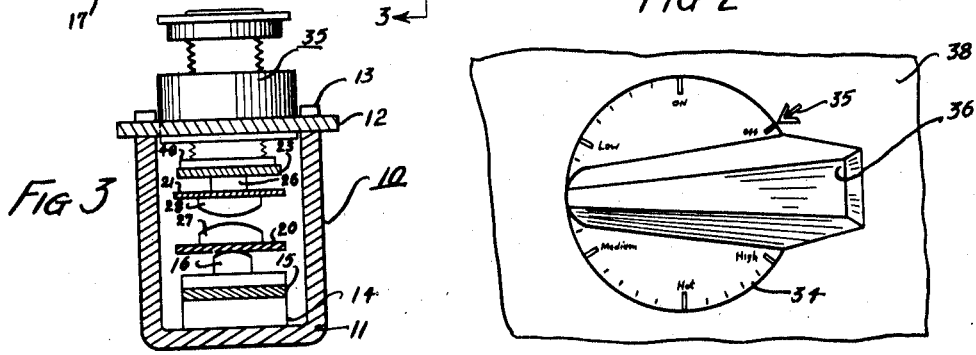
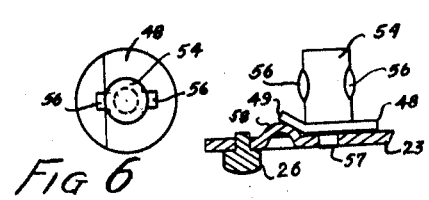
INVENTOR.
William H. Fischer
BY Hoodling and Krost,
ATTORNEY Patented July 8, 1941

2,248,666

UNITED STATES PATENT OFFICE 2,248,666

THERMOSTATIC SWITCH

William H. Fischer, Des Plaines, Ill., assignor to Dominion Electrical Manufacturing, Inc.

Application November 25, 1938, Serial No. 242,159

7 Claims. (Cl. 200—137)

My invention relates to thermostats and switches and more particularly to a thermostat and a switch which can be operated from the same control knob.

An object of my invention is to provide a thermostat control and a switch control on one control knob.

Another object of my invention is to simplify the controls of an electrically heated appliance by combining the thermostat control and the switch control.

Another object of my invention is to cut the costs of manufacturing an electrical appliance by combining several controls.

Still another object of my invention is to provide more accurate means for adjusting the thermostat than has hitherto been used in connection with the switch control.

A further object of my invention is to provide a simple and convenient adjustment in connection with the switch control and the thermostat control for adjusting the thermostat to compensate for loss of resiliency in the resilient members and for permanent change in the length of the thermostatic member.

A still further object of my invention is to combine three regulatory means on one control shaft, each to operate separately on one thermostat to simply and accurately control the thermostat, thereby producing an inexpensive but well regulated electrical appliance.

Another object of my invention is to provide a thermostatic switch which may be manually operable to turn electricity on and off at will and which may be adjustably set to automatically turn the electricity on and off depending upon the temperature setting and the temperature of the electrically heated appliance.

Other objects and a fuller understanding of my invention may be had by referring to the following description and claims, taken in conjunction with the accompanying drawing, in which:

Figure 1 is a side elevation view of a thermostat constructed in accordance with my invention and showing a control knob mounted on a part of an electrical appliance;

Figure 2 is a cross-sectional view of my thermostat taken along the longitudinal center thereof;

Figure 3 is another cross-sectional view of my invention taken along line 3—3 of Figure 2;

Figure 4 is a top view of the actuating control knob of my invention;

Figure 5 is a side elevational view of a shoe position of my invention, and

Figure 6 is a top view of the shoe shown in Figure 5.

With reference to Figure 2 of the drawing, it will be noted that my invention comprises a thermostatic switch assembly 10 comprising a substantially U-shaped channel temperature responsive member 11 which is designed to rest flat on a heated surface such as the sole plate 9 of an electric iron, or other electrical appliance. On top of the U-shaped channel temperature responsive member 11 there is a flat top piece 12 which is secured to the U-shaped channel member by means of projections 13 on the U-shaped channel member being inserted through slots in the flat top piece and upset to form virtually a rivet head. Inside the case which is formed by covering the open part of the U-shaped channel temperature responsive device 11 with the flat top piece 12 and at the bottom of the channel there is fastened, by rivets 17, to the temperature responsive piece 11 a flat steel spring 14. As can be best seen in Figure 2 the steel spring 14 is crimped upwardly to form a raised portion 15 which supports an insulated engaging member 16.

Above the insulated engaging member 16 and urged upwardly by it is a resilient contact strip 20 which carries current into the thermostat from an outside source 18. Above the resilient contact strip 20 and spaced from it when unconstrained is a second resilient contact strip 21 which passes the current to the heating element by means of conductors 19. Between the two contact strips and arranged to engage each other if either strip is actuated, are a pair of contact points 27 and 28 respectively secured to the strips 20 and 21. Suspended above the strip 21 is an L-shaped suspended member 23 pivotally secured to the top of the U-shaped channel member 11. To the suspended member 23 there is attached an insulated engaging member 26 which is adapted to engage the strip 21 and press it down when the suspended member 23 is turned. The suspension member 23 is actuated by an actuating device 35 which comprises a handle or knob 36 mounted on a revolvable shaft 37 through the casing 38 of an electrical appliance. A swinging arm 39 is suitably attached to the revolvable shaft 37 by upsetting the end of the shaft to form a rivet head. The swinging arm 39 is adapted to fit between the bifurcated arm of a second swinging arm 40 which is attached to a rotatable hollow threaded shaft 45.

On the flat top piece 12 there is mounted a collar 47 having female threads for threadably receiving the hollow threaded shaft 45 which may be adjustably moved up and down as the knob 36 is turned. Adjustably secured to the lower end of the hollow rotatable shaft 45 by means of extending ears 56 slidably fitting in longitudinal slots 53 and rotatable with the shaft is an engaging shoe 54 having an engaging surface 48 at its base. The engaging surface 48 is substantially flat with the exception of a relieved portion 49. The flat portion may be described as the "on" portion and relieved portion as the "off" portion. Below the engaging surface 48 there extends a small projection 57 which fits into a hole in the L-shaped suspension member 23. Extending above the L-shaped suspension member and positioned to be under the rotating shoe 54 is a raised portion 58, which may be made by slitting the suspension member 23 and bending the raised portion 58 upward as can be seen in Figure 5. Bending the raised portion 58 foreshortens it and provides a slot into which the engaging member 26 may be positioned.

When the knob 36 is turned to its "off" position the shoe 54 is rotated until the relieved portion 49 is above the raised portion 58. The resilient contact strip 21 then forces the suspension member 23 upward until the raised portion 58 touches the relieved portion 49. This upward movement allows the contact points 27 and 28 to separate thereby preventing the flow of current through the contact strips 20 and 21. When it is desired to turn the electrical apparatus "on" the knob 36 is rotated to the "on" position thereby causing the threaded shaft 45 to rotate within the stationary collar 47 and positioning the flat "on" portion of the engaging surface 48 above the raised portion 58. Thus, by the double action of the downward movement of the threaded shaft 45 and the downward displacement of the suspension member 23 by the flat portion of the engaging surface 48 the suspension member 23 is constrained against the resilient contact strip 21 forcing it downward into contact with the contact strip 20 thereby allowing electric current to flow through the apparatus.

The U-shaped channel member 11 together with the crimped spring 14 form the temperature responsive element of the thermostatic switch. As the electrical apparatus heats up the U-shaped channel member 11 expands longitudinally at a rate greater than the expansion of the crimped steel spring 14. This is because the U-shaped channel member 11 is preferably made of aluminum while the crimped spring 14 is made of steel which has a much lower coefficient of expansion than the aluminum. This difference in expansion allows the U-shaped aluminum channel member 11 to stretch the crimped steel spring 14 thereby causing the insulated engaging member 16 to drop down and allow the resilient contact strip 20, which has been constrained upward, to move away from the contact strip 21 thereby breaking the electrical circuit. When the apparatus has cooled due to the breaking of the electrical circuit the U-shaped channel member 11 shrinks forcing the ends of the crimped steel spring 14 together and the attached insulated engaging member 16 upward thereby constraining the contact strip 20 in contact with the contact strip 21 to re-establish the electric circuit and re-heat the apparatus.

When it is desired to regulate the temperature to which the apparatus may be heated after the contact between points 27 and 28 is made, the actuating device 36 is turned farther and causes the threaded actuating shaft to screw farther into the collar 47 thereby constraining the suspension member 23 to push the contact strips 20 and 21 farther down. This action causes the lower contact strip 20 to be bent about the insulated engaging member 16 as a fulcrum. The farther down the contact strip 20 is bent, the farther out the U-shaped channel member 11 must stretch to allow the crimped steel spring 14 to drop sufficiently to break the contact between the points 27 and 28.

The steel spring 14 serves another purpose beside constraining the contact strip 20. It imparts a longitudinal compressive force to the U-shaped channel member 11 which is necessary to counteract the growing tendency which all aluminum parts which are alternately heated and cooled have. The combination of the aluminum U-shaped channel member 11 and the steel spring 14 is shown, described and claimed in application Serial No. 187,883, filed January 31, 1938, by William A. Barnes for Temperature responsive device and assigned to the Dominion Electrical Manufacturing Company now Patent No. 2,217,328 dated October 8, 1940.

An adjustment 62 is used to accurately set the temperature of the electrical appliance and make the settings coincide with the markings on the control knob 36 before the instrument leaves the factory. The adjustment 62 comprises a threadable set screw 63 in the hollow rotatable shaft 45. When it is desired to adjust the temperature, the set screw 63 is turned with respect to the hollow rotatable shaft 45 thereby shifting the engaging shoe 54 with respect to the stationary collar 47.

To support the contact strips 20 and 21 I have provided a clamp 66 made of insulating material. This clamp comprises a top insulator 67, a bottom insulator 68 and a mica sheet 69, with bolts 71 therethrough and the whole attached to the flat toppiece 12 by nuts 72. The contact strip 21 is placed next to the lead 19 which is connected to the heating element between the top and bottom insulator blocks and the contact strip 20 is placed next to the outside current source 18 between the mica sheet 69 and the bottom insulator block 68.

The bolts 71 pass through the various contacts but spaced therefrom and through the clamp 66 and are fastened to the flat top piece 12 by means of the nuts 72.

Figure 4 is a top view of the control knob 36 having a graduated scale 34 and an indexing arrow 35 placed on the appliance. The knob 36 is rotatable with respect to the stationary indexing arrow 35 and the registration of the scale 34 with the arrow 35 indicates the operating condition of the appliance.

Summarizing, it is noted that my invention comprises the two contact strips 20 and 21, the manually operable actuating device 35 for constraining the strips 20 and 21 together or for allowing them to separate and the temperature responsive means for constraining the strips 20 and 21 together or for allowing them to separate.

The two contact strips 20 and 21 are mounted in the insulated clamp 66 in such a manner that they are normally resiliently disposed to separate from each other. The manually operable actuating device 35 is comprised of the threaded stem 45, the stationary collar 47, and the engaging shoe 54 which has a flat "on" portion 48 and an inclined "off" portion 49 is rotatively connected to the threaded stem 45 by means of the projecting ears 56 which fit into the slots 53 in the stem. The slots 53 allow the engaging shoe 54 to move axially with respect to the threaded stem 45 when the adjusting screw 63 is turned to set the temperature of the apparatus. To turn the apparatus "on" the threaded stem 45 is turned and the combined action of the threads and the flat "on" portion constrain the contact strip 21 against the contact strip 20.

When it is desired to regulate the temperature setting of the thermostat, the threaded stem 45 is turned to influence the contact strips 20 and 21 independent of the inclined portion 49 of the engaging shoe 54. After the thermostat has been set and the switch turned on the temperature of the apparatus is governed by the U-shaped channel member 11 and the crimped spring 14 expanding and contracting to allow the contact strip 20 to drop away from or touch the contact strip 21.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an electrical appliance, a thermostatic switch comprising, in combination, first and second relatively movable contacts normally resiliently disposed to separate from each other, hollow threaded means, inclined means rotatively connected to said hollow threaded means, axial means in said hollow threaded means for adjustably setting the inclined means with respect to said hollow threaded means to influence the temperature setting of the said thermostatic switch, said hollow threaded means and said inclined means being manually rotatable together to move the first of said contacts to make a circuit with the second contact or to allow said first contact to spring away from said second contact to break the circuit, a temperature responsive element operable upon said second contact to make or break the circuit depending upon the temperature of the said electrical appliance, said hollow threaded means being operable separately from said inclined means to move both of said contacts to regulate the temperature setting of the said thermostatic switch.

2. In an electrical appliance, a thermostatic switch comprising, in combination, first and second relatively movable contacts normally resiliently disposed to separate, hollow threaded regulating means, adjustable shoe means having a flat "on" portion and an inclined "off" portion, said adjustable shoe means being rotatively connected to said hollow regulating means, axial means in said hollow threaded regulating means for adjustably setting the inclined means with respect to said hollow regulating means to influence the temperature setting of the said thermostatic switch, said hollow regulating means and said adjustable shoe means being rotatable together to displace the first of said contacts into engagement with said second contact, said displacement being the sum of the thread displacement and the displacement of the "on" portion of the shoe means, and a temperature responsive element operable upon said second contact to make or break the circuit depending upon the temperature of the said electrical appliance, said hollow threaded regulating means being operable separately from said inclined "off" portion of the adjustable shoe means to move both of said contacts to regulate the temperature setting of the said thermostatic switch.

3. In an electrical appliance, a thermostatic switch comprising, in combination, a pair of relatively movable conductors normally resiliently disposed to separate, hollow regulating thread means, shoe means having a regulating "on" portion and a relieved "off" portion and adapted to turn as said hollow regulating thread means turns, actuating means for turning said hollow regulating thread means, motion transmitting means positioned between said conductors and said shoe means and resiliently kept in contact with the shoe means by one of the resilient conductors, said "off" portion of the shoe means permitting the motion transmitting means and one of said conductors to move away from the other conductor, and said regulating "on" portion of the shoe means in combination with the regulating thread means causing said motion transmitting means to move the conductors to regulate the temperature setting of the said thermostatic switch, and means in said hollow regulating means for regulating the temperature setting of the thermostatic switch independently of said actuating means.

4. In an electrical appliance, a thermostat switch comprising, in combination, first and second relatively movable contacts normally resiliently disposed to separate, hollow threaded regulating means, adjustable shoe means having a flat "on" portion and an inclined "off" portion, said adjustable shoe means being rotatively connected to said regulating means, axial means in said hollow threaded regulating means for adjustably setting the inclined means with respect to said regulating means to influence the temperature setting of the said thermostatic switch, said regulating means and said adjustable shoe means being rotatable together to displace the first of said contacts into engagement with said second contact, said displacement being the sum of the thread displacement and the displacement of the "on" portion of the shoe means, and a temperature responsive element operable upon said second contact to make or break the circuit depending upon the temperature of the said electrical appliance, said threaded regulating means being operable separately from said inclined "off" portion of the adjustable shoe means to move both of said contacts to regulate the temperature setting of the said thermostatic switch.

5. A thermostatic switch control comprising, in combination, a pair of relatively movable contacts, means for moving said contacts, said means including rotatable shoe means having a flat portion and an inclined portion with a rapid transition therebetween, a rotatable hollow threaded shaft and calibrating means movably mounted in said hollow shaft, said shoe means and said threaded shaft comprising a switch and being rotatable together to effect a quick make or break between said contacts by the total displacement of the threads on the shaft and the rapid transition on the shoe means, said shoe means and said threaded shaft also being rotatable together to form a regulating means to effect a slow regulating movement on said contacts by the displacement of the threads on the shaft, and said calibrating means being movable with respect to said threaded shaft to alter the position of the shoe means with respect to the threaded shaft thereby modifying the effect that the switch and the regulating means have upon the thermostatic switch.

6. A thermostatic switch comprising, in combination, a pair of relatively movable contact arms fixed at one end and free at the other end, a movable contact on the free end of each of said pair of contact arms, temperature responsive means for moving the first of said contacts, said temperature responsive means engaging the first of said contact arms at a fulcrum point between said fixed end and said contact, and manually operated means for moving the second of said contacts to provide an "on" and "off" switch for said thermostatic switch and for bending the first of said contacts about the said fulcrum point to regulate the temperature of the said thermostatic switch, said manually operated means comprising a turnable shaft for actuating the second of said contacts and a calibrating means for changing the length of said turnable shaft to adjust the temperature setting of the said thermostatic switch.

7. In an electrical appliance, a thermostatic switch, comprising, in combination, a pair of resilient arms each being mounted at one end and free at the other end, contacts mounted on the free ends of said resilient arms for regulating the electrical circuit through the said appliance, manually operable means for engaging one of said resilient arms between the said contact and the said fixed end to manually regulate the thermostatic switch, thermostatic means for engaging the other of said resilient arms between the said contact and the said fixed end to automatically regulate the thermostatic switch, said manually operable means comprising a hollow regulating means and a calibrating means mounted therein, said calibrating means being adapted to adjust the engagement relationship between the said manually operable means and the said resilient arm engaged thereby to affect the regulating action of the manually operable means upon the thermostatic switch.

WILLIAM H. FISCHER.